(12) United States Patent
Liang et al.

(10) Patent No.: US 10,962,872 B2
(45) Date of Patent: Mar. 30, 2021

(54) DYNAMIC BRIGHTNESS ADJUSTING METHOD AND PROJECTOR

(71) Applicant: QISDA CORPORATION, Taoyuan (TW)

(72) Inventors: Li-Wei Liang, Taoyuan (TW); Chih-Wei Cho, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 306 days.

(21) Appl. No.: 15/895,979

(22) Filed: Feb. 13, 2018

(65) Prior Publication Data
US 2018/0307130 A1    Oct. 25, 2018

(30) Foreign Application Priority Data

Apr. 25, 2017    (CN) .......................... 201710277686.2

(51) Int. Cl.
| | |
|---|---|
| *G03B 21/20* | (2006.01) |
| *G09G 5/10* | (2006.01) |
| *G03B 21/00* | (2006.01) |
| *H04N 9/31* | (2006.01) |
| *G02B 26/00* | (2006.01) |
| *G09G 5/02* | (2006.01) |
| *G09G 3/00* | (2006.01) |
| *G09G 3/34* | (2006.01) |

(52) U.S. Cl.
CPC ....... *G03B 21/2053* (2013.01); *G02B 26/008* (2013.01); *G03B 21/008* (2013.01); *G09G 3/002* (2013.01); *G09G 3/346* (2013.01); *G09G 3/3413* (2013.01); *G09G 5/02* (2013.01); *G09G 5/10* (2013.01); *H04N 9/3155* (2013.01); *H04N 9/3182* (2013.01); *G09G 2320/0242* (2013.01); *G09G 2320/0285* (2013.01); *G09G 2320/066* (2013.01); *G09G 2320/0626* (2013.01)

(58) Field of Classification Search
CPC ..... H04N 5/00–956; H04N 9/31–3197; G03B 21/00–64; G02B 26/00–129; G09G 5/00–42
See application file for complete search history.

(56) References Cited

U.S. PATENT DOCUMENTS

2013/0044297 A1*  2/2013  Horiguchi ............ H04N 9/3155
                                                                353/85

\* cited by examiner

*Primary Examiner* — Christina A Riddle
*Assistant Examiner* — Christopher A Lamb, II

(57) ABSTRACT

A dynamic brightness adjusting method is used for adjusting output brightness of an image projected by a projector. The method controls a lighting component of the projector to emit light in an adjustable lighting power, and controls a light limiting device disposed in front of the lighting component to allow the light to pass through in an adjustable light-passing rate. In an embodiment, the method adjusts the lighting power and the light-passing rate at the same time. In another embodiment, according to a brightness range in which a nominal maximum brightness value relative to an input image is located, the method fixes the lighting power and adjusts the light-passing rate according to the fixed lighting power and the nominal maximum brightness value, or fixes the light-passing rate and adjusts the lighting power according to the fixed light-passing rate and the nominal maximum brightness value.

24 Claims, 7 Drawing Sheets

DYNAMIC BRIGHTNESS ADJUSTING METHOD AND PROJECTOR

BACKGROUND OF THE INVENTION

1. Field of the Invention

The invention relates to a dynamic brightness adjusting method and a projector, and especially relates to a dynamic brightness adjusting method for a light source of a projector and a projector using the method.

2. Description of the Prior Art

For conventional projectors with a digital micromirror device, the micromirrors of the digital micromirror device under an OFF state still cannot completely avoid light from being reflected to a screen, so a relatively dark portion (or a portion in lower gray-level values) of a projected image are not shown correctly. For example, when the micromirrors are at the OFF state, a dark portion (e.g. the brightness values thereof are zero) of an image frame is still projected with little brightness, so that the contrast of the whole projected image deviates from the original input image frame (i.e. the contrast being decreased). Therefore, some projectors use methods of dynamically adjusting contrast for an improvement in the contrast distortion problem. For example, in logic, the image contrast can be improved by lowering the intensity of the light provided to the digital micromirror device so that the dark portion of the image frame can be displayed in a lower brightness, and by additionally compensating the projection brightness for other relatively bright portions. Currently, there is a method of dynamically adjusting contrast that increases a contrast by adjusting a lighting power of a light source. There is another method of dynamically adjusting contrast that increases a contrast by physically partially covering a light source for limiting the light emitted by the light source. In the former, the reduction in the lighting power is conducive to a prolongation of service life of the light source. However, the projected images have a larger color distortion. The adjustment to the lighting power is limited, for example, an adjustable range of the lighting power of a mercury lamp is about from 30% to 100%. In the latter, although the service life of the light source is not affected, the projected images have a smaller color distortion and the method can provide a light-limitation effect in a range from 0% to 100%. Therefore, the current adjusting methods have individual advantages and disadvantages but cannot have all of the advantages individually.

SUMMARY OF THE INVENTION

An objective of the invention is to provide a dynamic brightness adjusting method, which controls a lighting component of a projector to emit light in an adjustable lighting power and controls a light limiting device in front of the lighting component to allow the light to pass through in a light-passing rate, so as to improve a contrast of an image projected by the projector.

A dynamic brightness adjusting method of an embodiment according to the invention is used for adjusting output brightness of an image projected by a projector. The projector includes a processor, a lighting component, and a light limiting device. The light limiting device is disposed in front of the lighting component. The processor is electrically connected to the lighting component and the light limiting device. The processor controls the lighting component to emit light in a lighting power and controls the light limiting device to allow the light to pass through in a light-passing rate. The dynamic brightness adjusting method includes the following steps: (a) the processor receiving data of an image frame and determining a nominal maximum brightness value relative to the image frame; (b) the processor determining which one of a plurality of brightness ranges the nominal maximum brightness value is located in; and (c) according to the determined brightness range in which the nominal maximum brightness value is located, the processor fixing the lighting power of the lighting component and adjusting the light-passing rate of the light limiting device according to the fixed lighting power and the nominal maximum brightness value, or the processor fixing the light-passing rate of the light limiting device and adjusting the lighting power of the lighting component according to the fixed light-passing rate and the nominal maximum brightness value. Thereby, the dynamic brightness adjusting method can take the advantages due to the adjustment to the lighting power of the lighting component and the structurally limitation on the light emitted by the lighting component by implementing different adjusting means in different brightness ranges.

A dynamic brightness adjusting method of another embodiment according to the invention is used for adjusting output brightness of an image projected by a projector. The projector includes a processor, a lighting component, and a light limiting device. The light limiting device is disposed in front of the lighting component. The processor is electrically connected to the lighting component and the light limiting device. The processor controls the lighting component to emit light in a lighting power and controls the light limiting device to allow the light to pass through in a light-passing rate. The dynamic brightness adjusting method includes the following steps: (a) the processor receiving data of an image frame and determining a nominal maximum brightness value relative to the image frame; and (b) according to the nominal maximum brightness value, the processor adjusting the lighting power of the lighting component and the light-passing rate of the light limiting device so that a product of the adjusted lighting power and the adjusted light-passing rate is substantially equal to the nominal maximum brightness value. Thereby, the dynamic brightness adjusting method can adjust the lighting power of the lighting component and the light-passing rate of the light limiting device simultaneously, so as to reduce the time for the adjustment and take the advantages due to the adjustment to the lighting power of the lighting component and the structurally limitation on the light emitted by the lighting component.

Another objective of the invention is to provide a projector, which controls a lighting component to emit light in a lighting power and controls a light limiting device disposed in front of the lighting component to allow the light to pass through in a light-passing rate, so as to improve a contrast of an image projected by the projector.

A projector of an embodiment according to the invention includes a digital micromirror device, a lighting component, and a light limiting device, a projection lens, and a processor. The lighting component is disposed toward the digital micromirror device. The light limiting device is disposed between the lighting component and the digital micromirror device. The processor is electrically connected to the lighting component, the light limiting device, and the digital micromirror device respectively. The processor controls the lighting component to emit light in a lighting power, controls the light limiting device to allow the light to pass through in a light-passing rate, and controls the digital micromirror device to reflect the light passing through the light limiting device to be projected out the projector through the projection lens. Therein, when the processor receives data of an image frame, the processor determines a nominal maximum brightness value relative to the image frame according to the data. The processor determines which one of a plurality of brightness ranges the nominal maximum brightness value is located in. According to the determined brightness range in which the nominal maximum brightness value is located, the processor fixes the lighting power of the lighting component and adjusts the light-passing rate of the light limiting device according to the fixed lighting power and the nominal maximum brightness value, or the processor fixes the light-passing rate of the light limiting device and adjusts the lighting power of the lighting component according to the fixed light-passing rate and the nominal maximum brightness value. Similarly, the projector can take the advantages due to the adjustment to the lighting power of the lighting component and the structurally limitation on the light emitted by the lighting component by implementing different adjusting means in different brightness ranges.

Compared with the prior art, the invention provide a dynamic brightness adjusting method and a projector. The dynamic brightness adjusting method is used to for adjusting output brightness of an image projected by the projector. The projector includes a processor, a lighting component, and a light limiting device. The processor receives data of an image frame and determines a nominal maximum brightness value relative to the image frame. According to the nominal maximum brightness value, the processor controls the lighting component to emit light in an adjustable lighting power and controls the light limiting device to allow the light to pass through in an adjustable light-passing rate, so as to improve the contrast of the image projected by the projector.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
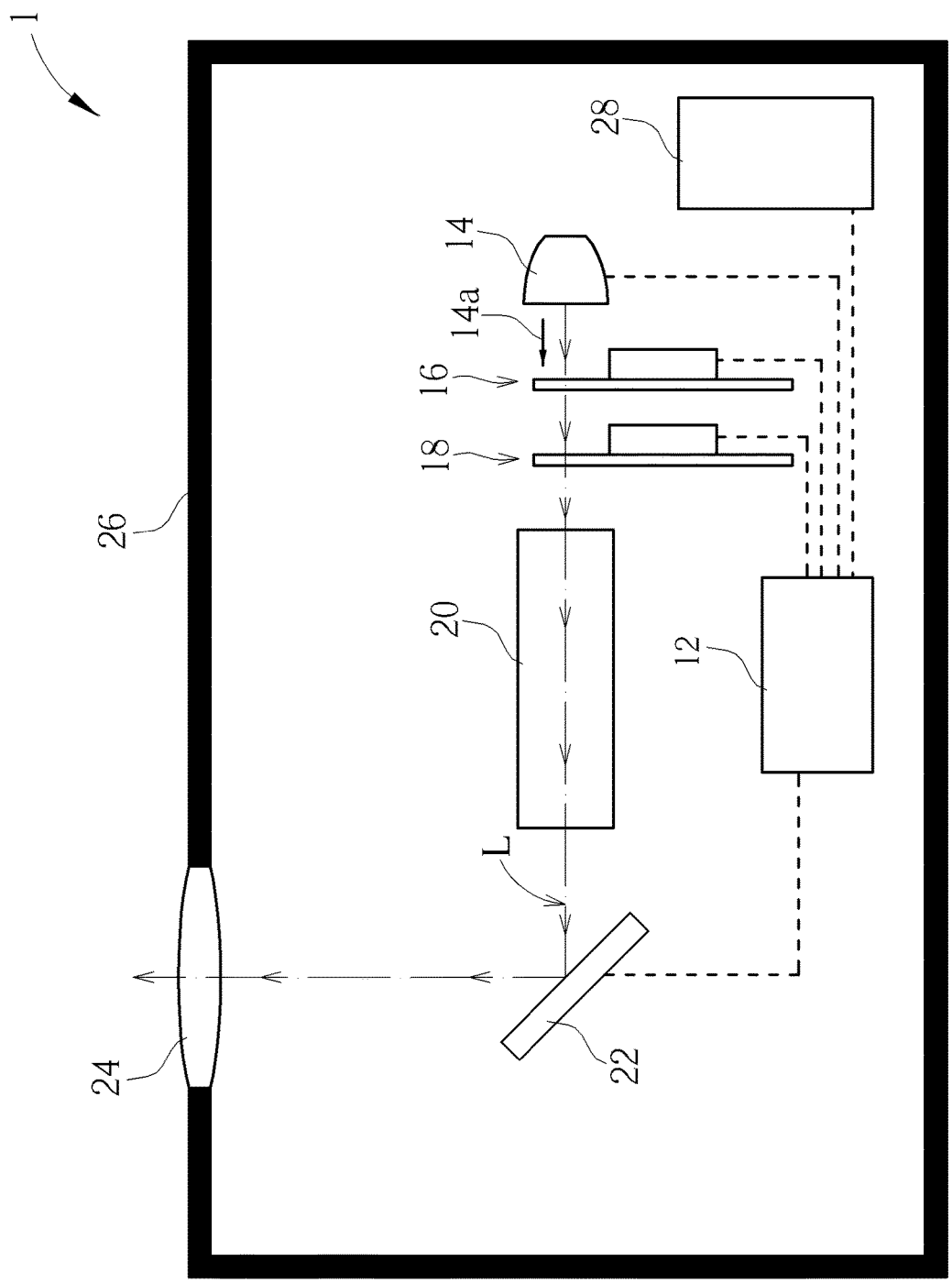
FIG. 1 is a schematic diagram illustrating a configuration of a projector of an embodiment according to the invention.

Please refer to FIG. 1. A projector 1 of an embodiment according to the invention includes a processor 12, a lighting component 14, a light limiting device 16, a color wheel 18, an integration rod 20, a digital micromirror device 22, a projection lens 24, and a device casing 26 (shown in bold dashed lines) accommodating the above components. The lighting component 14 is disposed toward the digital micromirror device 22. The light limiting device 16 is disposed in front of the lighting component 14 relative to an emitting direction 14a of the lighting component 14 (i.e. between the lighting component 14 and the digital micromirror device 22) for selectively covering light L (indicated by chain lines with arrows) emitted by the lighting component 14. The color wheel 18 is disposed between the integration rod 20 and the light limiting device 16, so that after passing through the light limiting device 16, the light L is optically filtered by the color wheel 18 and then enters the integration rod 20 for optical mixture. The projection lens 24 is disposed on the device casing 26. The digital micromirror device 22 is substantially disposed between the integration rod 20 and the projection lens 24, so that the light L emitted out of the integration rod 20 can be reflected by the digital micromirror device 22 to be projected through the projection lens 24 onto a screen (e.g. a projection curtain or wall) outside the projector 1. The processor 12 is electrically connected to the lighting component 14, the light limiting device 16, the color wheel 18, and the digital micromirror device 22 respectively (indicated by dashed lines). The processor 12 controls the lighting component 14 to emit the light L in a lighting power, controls the light limiting device 16 to allow the light L to pass through the light limiting device 16 in a light-passing rate, and controls the digital micromirror device 22 to reflect the light L passing through the light limiting device 16 to be projected through the projection lens 24 out of the projector 1. Therefore, by adjusting the lighting power of the lighting component 14 and the light-passing rate of the light limiting device 16, the processor 12 can implement a contrast adjustment to each image frame to be projected.

Figure 2:
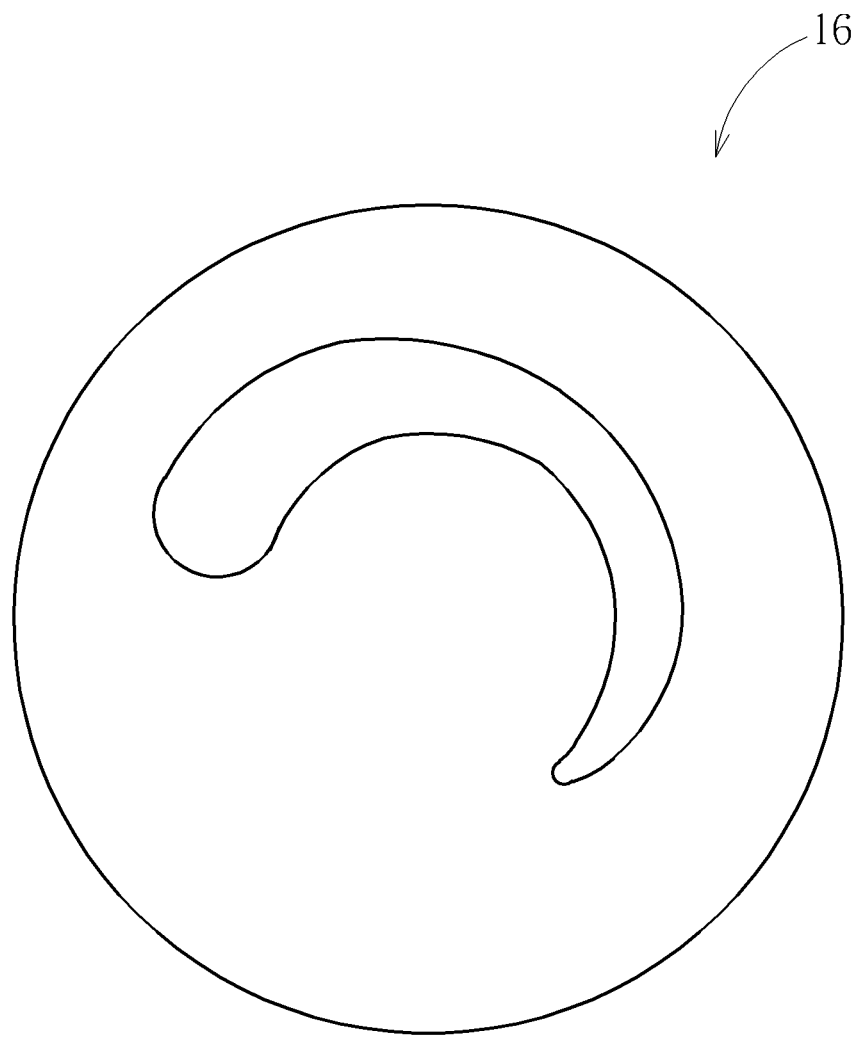
FIG. 2 is a schematic diagram illustrating a rotatory wheel of a light limiting device of the projector in FIG. 1.

In practice, the processor 12 can be achieved by a circuit board module (e.g. including a circuit board and a processor unit, a memory, at least one electrical connection interface, and other electronic components needed in operation, which are disposed on the circuit board). The digital micromirror device 22 can be achieved by a conventional digital micromirror device that, in general, includes a device carrier, a plurality of micromirrors, a plurality of corresponding micromirror supports (for supporting the corresponding micromirror on the device carrier) and corresponding driving mechanisms for driving the corresponding micromirror supports to (e.g. by electrostatic force as driving force). Thereby, the processor 12 can control the deflection status of each micromirror. The light limiting device 16 can be achieved by a combination of a wheel with a through hole structure and a motor of which the rotation angle is controllable (e.g. a server motor). The size of the through hole structure is designed to control the rate of the light L that is allowed to pass through the through hole structure (i.e. the light-passing rate). Thereby, the processor 12 can control the rotation orientation of the wheel by controlling the operation of the motor, so as to control the light-passing rate of the light limiting device 16. The through hole structure of the wheel can be achieved by slots or circular apertures of different sizes formed at different angular positions of the wheel, or by a through slot, of which the profile continuously varies in the angular direction, as shown by FIG. 2. The color wheel 18 can be achieved by a combination of a wheel with optical filters thereon and a motor. Thereby, the processor 12 can control the optical filtration effect of the color wheel 18 to the light L by controlling the operation of the motor. In addition, in practice, the projector 1 can include a power supply 28 electrically connected to the processor 12, for supplying power to the components inside the projector 1.

In the embodiment, the lighting component 14 is a mercury-vapor lamp which has an original brightness curve between brightness output and luminous intensity input (shown by a continuous curve line in FIG. 3); therein, the luminous intensity input (horizontal axis) and the brightness output (vertical axis) are expressed in percentage form for description simplification, but the invention is not limited thereto. A variable percent of light emitted by the lighting component 14 in a fixed lighting power (e.g. 100% lighting power) is taken as the luminous intensity input of the original brightness curve. The variable percent of light taken as the luminous intensity input will be reflected by the digital micromirror device 22 and projected through the projection lens 2 onto a screen, and then the corresponding brightness output can be obtained by measuring the projected light on the screen. For example, for a 100% luminous intensity input, all of the light emitted by the lighting component 14 in 100% lighting power (i.e. 100% of the light) will be measured for the corresponding brightness output; for a 0% luminous intensity input, none of the light emitted by the lighting component 14 in 100% lighting power (i.e. 0% of the light) will be measured for the corresponding brightness output; for a 50% luminous intensity input, 50% of the light emitted by the lighting component 14 in 100% lighting power (i.e. 50% of the light) will be measured for the corresponding brightness output. For other luminous intensity inputs, the corresponding brightness outputs can be obtained by the same way. In practice, by a way of physically covering light (e.g. by the light limiting device 16 covering the light emitted by the lighting component 14) or by controlling the time period for which the micromirror device 22 reflects light, the light emitted by the lighting component 14 can be supplied in different percent to be projected. Furthermore, a rated lighting power for the lighting component 14 emitting the light can be defined as the 100% lighting power. In addition, in the embodiment, for the mercury-vapor lamp, the original brightness curve is a curve with gamma 2.4.

Furthermore, in the embodiment, the lighting component 14 also has an adjusted brightness curve between brightness output and luminous intensity input (shown by a dashed line in FIG. 3); therein, the luminous intensity input (horizontal axis) and the brightness output (vertical axis) are expressed in percentage form for description simplification, but the invention is not limited thereto. The light emitted by the lighting component 14 in a variable lighting power is taken as the luminous intensity input of the adjusted brightness curve. For example, for a 100% luminous intensity input, the lighting component 14 emits light in 100% lighting power will be measured for the corresponding brightness output; for a 50% luminous intensity input, the lighting component 14 emits light in 50% lighting power will be measured for the corresponding brightness output; for a 30% luminous intensity input, the lighting component 14 emits light in 30% lighting power will be measured for the corresponding brightness output, and so on for other luminous intensity inputs between 30% and 100% luminous intensity. It is added that in practice, the mercury-vapor lamp has a minimum operation lighting power (e.g. 30%), so the above measurement method can only obtain the portion of the adjusted brightness curve corresponding to the input range from 30% to 100% luminous intensity. However, for convenience of understanding the difference between the original brightness curve and the adjusted brightness curve, the mercury-vapor lamp is supposed also to be capable of operating in 0% to 30% lighting power. Thereby, the portion of the adjusted brightness curve corresponding to the input range from 0% to 30% luminous intensity is obtained and shown in a chain line in the figure by extending the curve in the dashed line. For simplification of description, in the following, the adjusted brightness curve includes the portion shown in the dashed line and the portion in the chain line in principle. It is added that for the inputs of 0% luminous intensity and 100% luminous intensity, the measurement conditions for the original brightness curve and the adjusted brightness curve are substantially the same, so the original brightness curve and the adjusted brightness curve inevitably intersect corresponding to the inputs of 0% luminous intensity and 100% luminous intensity.

Figure 3:
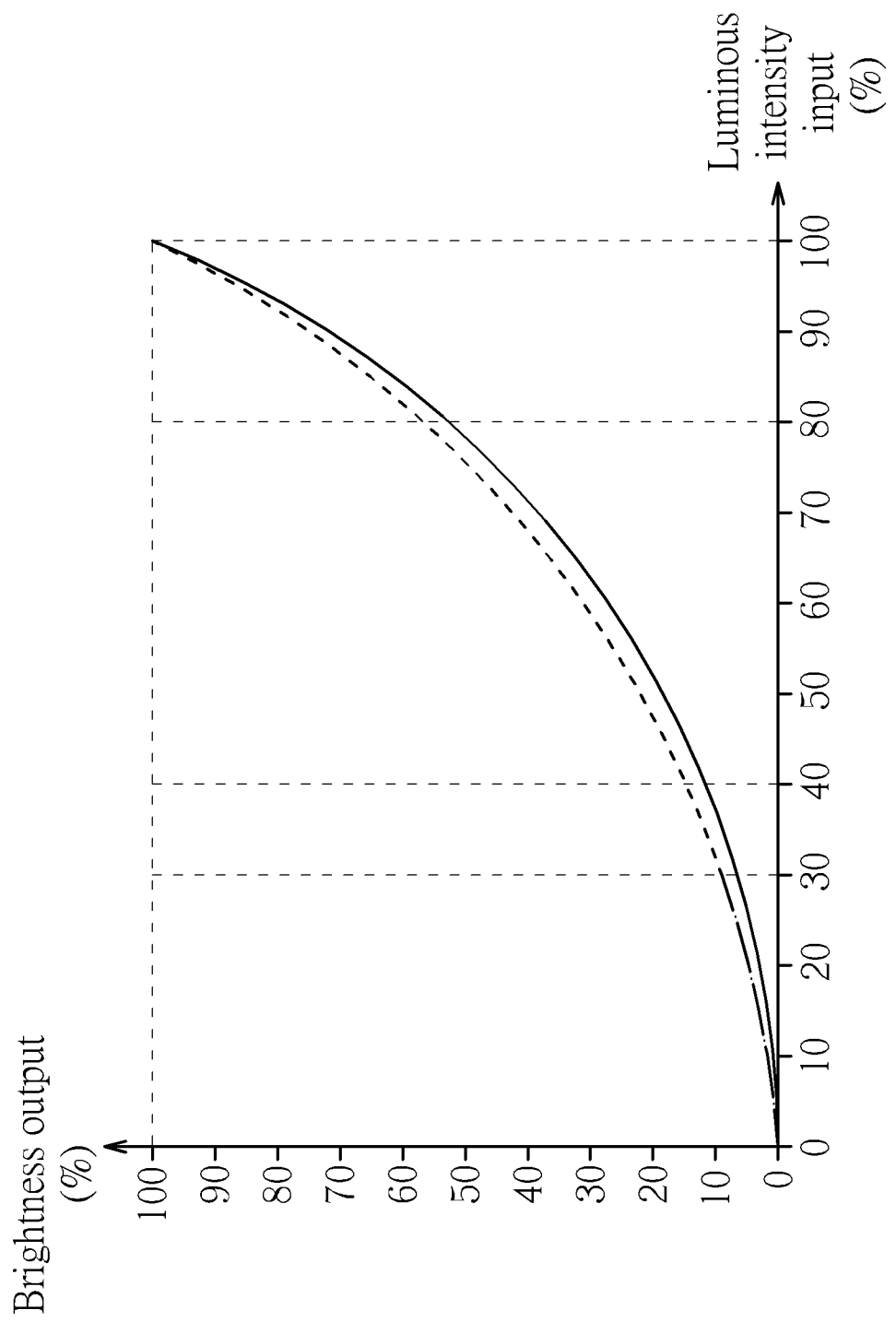
FIG. 3 is a schematic diagram showing the lighting property of a lighting component of the projector in FIG. 1.

As shown by FIG. 3, the original brightness curve and the adjusted brightness curve differ only except corresponding to the inputs of 0% luminous intensity and 100% luminous intensity and have a larger difference corresponding to the middle portion of luminous intensity input. In other words, when the lighting component 14 operates in a lighting power less than 100%, the projected light will involve color distortion; when the lighting component 14 operates in a lighting power of a middle percentage, the projected light will involve more serious color distortion. In practice, for the range of luminous intensity input (or lighting power) in which the color distortion is worse, the processor 12 can increase the contrast of the projected image by changing the light-passing rate of the light limiting device 16, so as to reduce the influence of color distortion on the projected image due to the change in the lighting power of the lighting component 14. For the range of luminous intensity input (or lighting power) in which the color distortion is not so worse, the processor 12 can increase the contrast of the projected image by changing the lighting power of the lighting component 14, which can extend the service life of the lighting component 14. For example, the luminous intensity input is divided into a plurality of brightness ranges. For input images in some of the brightness ranges, the processor 12 increases the contrast of the projected image by fixing the lighting power of the lighting component 14 and adjusting the light-passing rate of the light limiting device 16. For input images in another some of the brightness ranges, the processor 12 increases the contrast of the projected image by fixing the light-passing rate of the light limiting device 16 and adjusting the lighting power of the lighting component 14. Therefore, in practice, when the processor 12 receives data of an image frame, the processor 12 determines a nominal maximum brightness value relative to the image frame. The processor 12 determines which one of a plurality of brightness ranges the nominal maximum brightness value is located in. According to the determined brightness range in which the nominal maximum brightness value is located, the processor 12 fixes the lighting power of the lighting component 14 and adjusts the light-passing rate of the light limiting device 16 according to the fixed lighting power and the nominal maximum brightness value, or the processor 12 fixes the light-passing rate of the light limiting device 16 and adjusts the lighting power of the lighting component 14 according to the fixed light-passing rate and the nominal maximum brightness value. Therein, in practice, the nominal maximum brightness value relative to the image frame can be determined according to the statistics of the brightness values for all pixels of the image frame (e.g. counting the pixels for each brightness value). For example, excluding several or a fewer of brighter pixels (e.g. of which the number is less than 1% of the total pixels of the image frame), the maximum brightness value among the rest pixels is assigned to the nominal maximum brightness value relative to the image frame.

Furthermore, in practice, each brightness range can be determined by judging whether the difference between the brightness output of the adjusted brightness curve and the brightness output of the original brightness curve corresponding to any of the luminous intensity input in the brightness range is larger than a predetermined value. For example, continuous luminous intensity inputs, corresponding to which the differences in brightness output are larger than the predetermined value, can be grouped into one brightness range; that is, the difference in brightness output between the adjusted brightness curve and the original brightness curve corresponding to any of the luminous intensity input in the brightness range is larger than the predetermined value. For this brightness range, the processor 12 increases the contrast of the projected image by fixing the lighting power of the lighting component 14 and adjusting the light-passing rate of the light limiting device 16. Furthermore, continuous luminous intensity inputs, corresponding to which the differences in brightness output are less than the predetermined value, can be grouped into another brightness range; that is, the difference in brightness output between the adjusted brightness curve and the original brightness curve corresponding to any of the luminous intensity input in the brightness range is less than the predetermined value. For this brightness range, the processor 12 increases the contrast of the projected image by fixing the light-passing rate of the light limiting device 16 and adjusting the lighting power of the lighting component 14. In practice, the predetermined value can be determined according to a tolerant color distortion of general users. Furthermore, in principle, these brightness ranges have been set before the projector 1 leaves the factory. In addition, in the embodiment, the original brightness curve and the adjusted brightness curve shown in FIG. 3 are based on the measurement of red light for the luminous intensity input and the brightness output; however, the invention is not limited thereto. In practice, the curves also can be based on the measurement of other color lights (e.g. green light, blue light), or white light (e.g. light emitted by a mercury-vapor lamp), or a mixture of light by mixing red light, green light, and blue light in a ratio (or a weighting). The red light, the green light, the blue light, and the mixture of light can be obtained through the color wheel 18.

In a practical application, the plurality of brightness ranges includes a first range, a second range, a third range, and a fourth range. Therein, the first range is greater than a first brightness value lower limit and is less than a first brightness value upper limit. The first brightness value lower limit is 40%. The first brightness value upper limit is 80%. The second range is greater than a second brightness value lower limit and is less than a second brightness value upper limit. The second brightness value lower limit is 80%. The second brightness value upper limit is 100%. The third range is greater than a third brightness value lower limit and is less than a third brightness value upper limit. The third brightness value lower limit is 0%. The third brightness value upper limit is 30%. The fourth range is greater than a fourth brightness value lower limit and is less than a fourth brightness value upper limit. The fourth brightness value lower limit is 30%. The fourth brightness value upper limit is 40%.

When the processor 12 determines that the nominal maximum brightness value is located in the first range, the processor 12 fixes the lighting power of the lighting component 14 to be 80%, and the processor 12 also adjusts the light-passing rate of the light limiting device 16 according to the fixed lighting power and the nominal maximum brightness value. For example, the light-passing rate can substantially be equal to but not limited to a number of the nominal maximum brightness value divided by the fixed lighting power; therefore, the light-passing rate will be larger than 50% and less than 100%.

When the processor 12 determines that the nominal maximum brightness value is located in the second range, the processor 12 fixes the light-passing rate of the light limiting device 16 to be 100%, and the processor 12 also adjusts the lighting power of the lighting component 14 according to the fixed light-passing rate and the nominal maximum brightness value. For example, the lighting power can substantially be equal to but not limited to a number of the nominal maximum brightness value divided by the fixed light-passing rate; therefore, the lighting power will be larger than 80% and less than 100%.

When the processor 12 determines that the nominal maximum brightness value is located in the third range, the processor 12 fixes the lighting power of the lighting component 14 to be 30%, and the processor 12 also adjusts the light-passing rate of the light limiting device 16 according to the fixed lighting power and the nominal maximum brightness value. For example, the light-passing rate can substantially be equal to but not limited to a number of the nominal maximum brightness value divided by the fixed lighting power; therefore, the light-passing rate will be larger than 0% and less than 100%. It is added that the difference in brightness output between the original brightness curve and the adjusted brightness curve corresponding to the luminous intensity input in the third range is less than the difference in brightness output corresponding to the luminous intensity input in the fourth range, but in the embodiment, the mercury-vapor lamp has to operate in above 30% lighting power. Therefore, for the third range, adjusting the light-passing rate of the light limiting device 16 is used for increasing the contrast.

When the processor 12 determines that the nominal maximum brightness value is located in the fourth range, the processor 12 fixes the light-passing rate of the light limiting device 16 to be 100%, and the processor 12 also adjusts the lighting power of the lighting component 14 according to the fixed light-passing rate and the nominal maximum brightness value. For example, the lighting power can substantially be equal to but not limited to a number of the nominal maximum brightness value divided by the fixed light-passing rate; therefore, the lighting power will be larger than 30% and less than 40%. It is added that in the foregoing calculation for the adjusted lighting power and the adjusted light-passing rate, the phrase "substantially be equal to" includes cases of "exactly equal to"; however, the invention is not limited thereto. The phrase "substantially be equal to" also includes cases of being in a tolerance range in engineering. For example, if the nominal maximum brightness value is 65% and the fixed lighting power is 80%, then the light-passing rate can be adjusted to be 81%.

In the above practical application, the whole luminous intensity input is substantially divided into the plurality of brightness ranges correspondingly, so the processor 12 will implement the adjustment for each image frame (that is, the processor 12 selectively adjusting the lighting power of the lighting component 14 and the light-passing rate of the light limiting device 16 according to the brightness range in which the nominal maximum brightness value is located); however, the invention is not limited thereto. For example, in another practical application, the processor 12 implements the adjustment for increasing contrast only for image frames of which the nominal maximum brightness value is in two of the above ranges, which can reduce the load on the processor 12 and also can avoid influencing the smoothness of the projection of the projector 1. Therein, for one range (e.g. the first range or the third range), the processor 12 increases the contrast by fixing the lighting power of the lighting component 14 and adjusting the light-passing rate of the light limiting device 16; for the other range (e.g. the second range or the fourth range), the processor 12 increases the contrast by fixing the light-passing rate of the light limiting device 16 and adjusting the lighting power of the lighting component 14.

Furthermore, in the above practical application, the processor 12 increases the contrast by fixing one of the lighting power of the lighting component 14 and the light-passing rate of the light limiting device 16 and adjusting the other one for each range. In the above practical application, for the first range and the third range, the processor 12 increases the contrast by fixing the lighting power of the lighting component 14 and adjusting the light-passing rate of the light limiting device 16; for the second range and the fourth range, the processor 12 increases the contrast by fixing the light-passing rate of the light limiting device 16 and adjusting the lighting power of the lighting component 14. However, the invention is not limited thereto. For example, in another practical application, the processor 12 adjusts the lighting power of the lighting component and the light-passing rate of the light limiting device 16 simultaneously according to the nominal maximum brightness value, so that a product of the adjusted lighting power and the adjusted light-passing rate is substantially equal to the nominal maximum brightness value. For a specific range of luminous intensity input, the processor 12 limitedly adjusts the lighting power of the lighting component 14. For example, when the processor 12 determines that the nominal maximum brightness value is located in a predetermined brightness range, the processor 12 adjusts the lighting power of the lighting component 14 in an interval larger than 80% and less than 100%. In this case, the predetermined brightness range is set to be a brightness range larger than 80% and less than 100%. For another example, when the processor 12 determines that the nominal maximum brightness value is located in another predetermined brightness range, the processor 12 adjusts the lighting power of the lighting component 14 in an interval larger than 30% and less than 40%. In this case, the predetermined brightness range is set to be a brightness range larger than 30% and less than 40%. The above way of simultaneously adjusting the lighting power of the lighting component 14 and the light-passing rate of the light limiting device 16 is conducive to a reduction in the time for the whole adjustment (e.g. the time required for the improvement in the contrast of the projected image).

In addition, for the above practical applications, in practice, the adjustment to the lighting power of the lighting component 14 and the light-passing rate of the light limiting device 16 can be implemented through a look-up table, which can reduce the load on the processor 12 and also can reduce the time for the whole adjustment. For example, a look-up table (which is established and is stored in the memory of the processor 12 of the projector 1 before the projector 1 leaves the factory) includes a plurality of input brightness values (e.g. corresponding to the above brightness ranges). In the look-up table, each input brightness value corresponds to a set value of the lighting power of the lighting component 14 and a set value of the light-passing rate of the light limiting device 16. According to the look-up table, the processor 12 can determine an input brightness value corresponding to the nominal maximum brightness value (e.g. by comparing the nominal maximum brightness value with the plurality of the input brightness values in the look-up table to find out a matched input brightness value). The processor 12 can obtain a corresponding set value of the lighting power of the lighting component 14 and a corresponding set value of the light-passing rate of the light limiting device 16 from the look-up table according to the determined input brightness value, and then can set (or adjust) the lighting power of the lighting component 14 and the light-passing rate of the light limiting device 16 according to the corresponding set values.

Figure 4:
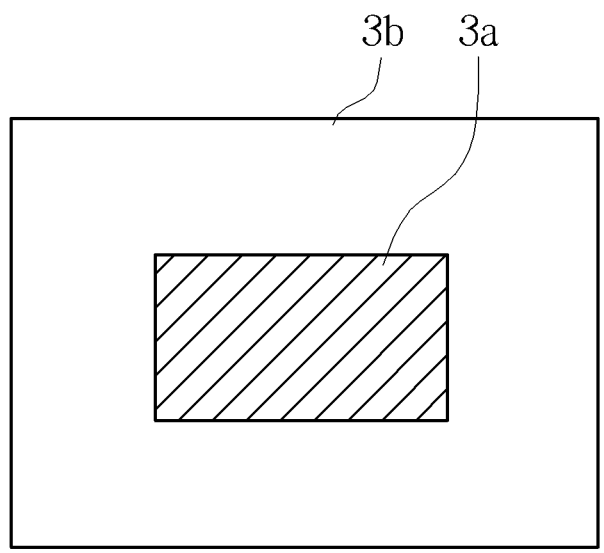
FIG. 4 is a schematic diagram illustrating the projector receiving an image frame according to an embodiment.

Please refer to FIG. 4, which is a schematic diagram illustrating the projector 1 receiving an image frame according to an embodiment. For description simplification, the image frame has only two kinds of brightness. Therein, pixels located in the central rectangle portion 3a (shown be hatch lines in the figure) are of 30% brightness; pixels located in the peripheral portion 3b are of 70% brightness. After the processor 12 adjusts the lighting power and the light-passing rate, the light L received by the digital micromirror device 22 is not of 100% brightness, so the processor 12 will adjust a time period for which the digital micromirror device reflects the light L for the corresponding pixel (e.g. by controlling the lasting time for which the micromirror corresponding to the pixel holds at ON state) according to the nominal maximum brightness value relative to the image frame, so as to compensate the intensity loss of the light L received by the digital micromirror device 22. For example, in the embodiment, the nominal maximum brightness value is 70%. The lighting power of the lighting component 14 is fixed to be 80%. The light-passing rate of the light limiting device 16 is adjusted to be 87.5% (i.e. equivalent to the number of 70% divided by 80%; in practice, it can be set to be 87% or 88% based on the action precision of the light limiting device 16). The time period for which the digital micromirror device 22 reflects light is adjusted to be 1.43 times (i.e. the number of 100% divided by 70%) of the predetermined time period (in practice, which includes the time for gamma correction) for which the digital micromirror device 22 reflects light.

Figure 5:
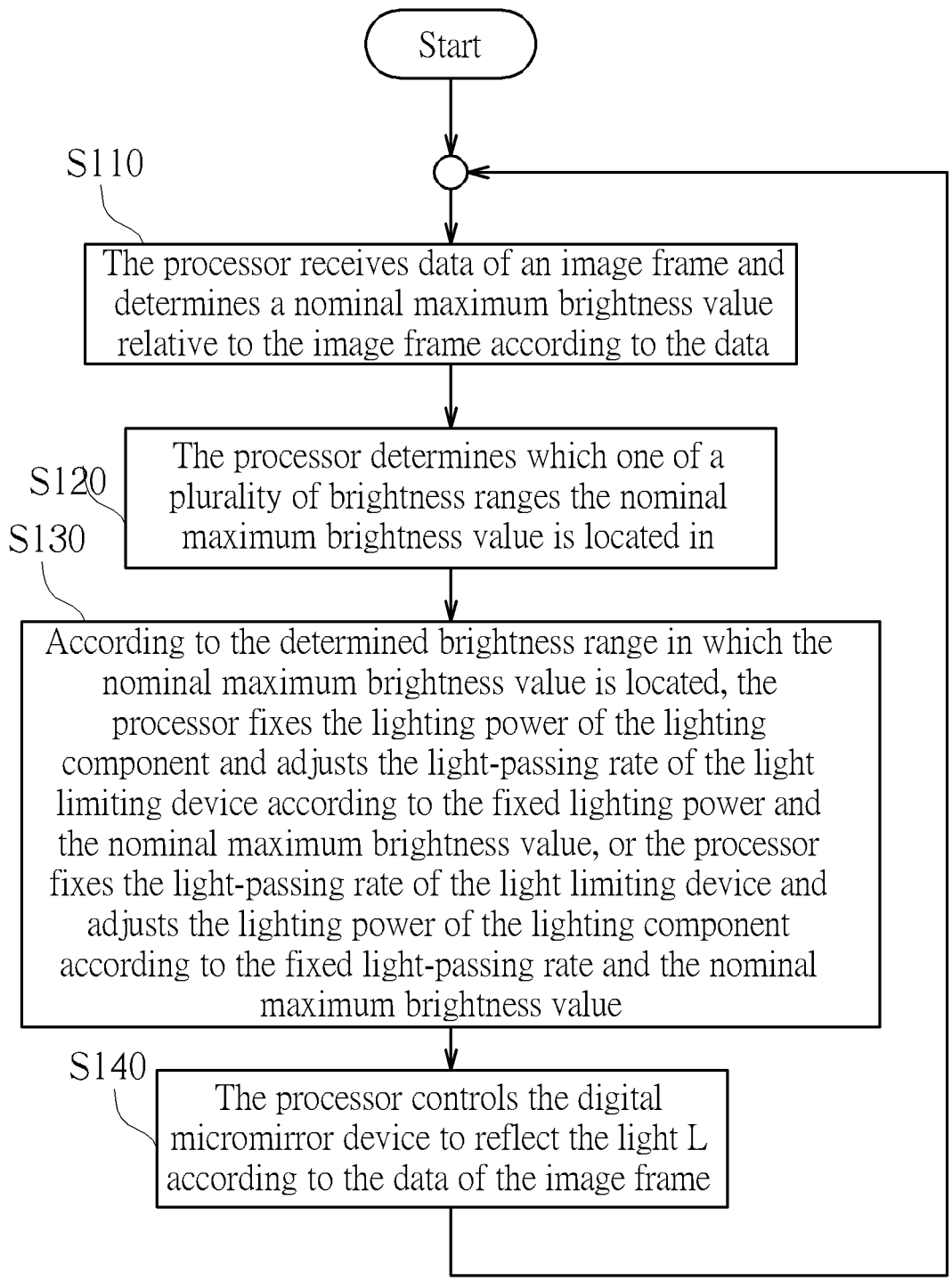
FIG. 5 is a flowchart of a dynamic brightness adjusting method according to the invention.

Please refer to FIG. 5, which is a flow chart of a dynamic brightness adjusting method according to the invention. The dynamic brightness adjusting method is used for adjusting output brightness of an image projected by a projector. For description simplification, the projector is achieved by the above projector 1, and therefore, for descriptions about the projector 1, please refer to the relevant descriptions and figures of the projector 1 in the foregoing, which will not be repeated in addition. As shown by FIG. 5, the dynamic brightness adjusting method includes: the processor 12 receiving data of an image frame and determining a nominal maximum brightness value relative to the image frame according to the data, as shown by the step S110; then, the processor 12 determining which one of a plurality of brightness ranges the nominal maximum brightness value is located in, as shown by the step S120; then, according to the determined brightness range in which the nominal maximum brightness value is located, the processor 12 fixing the lighting power of the lighting component 14 and adjusting the light-passing rate of the light limiting device 16 according to the fixed lighting power and the nominal maximum brightness value, or the processor 12 fixing the light-passing rate of the light limiting device 16 and adjusting the lighting power of the lighting component 14 according to the fixed light-passing rate and the nominal maximum brightness value, as shown by the step S130; and then, the processor 12 controlling the digital micromirror device 22 to reflect the light L according to the data of the image frame, as shown by the step S140. After reflected by the digital micromirror device 22, the light L is projected through the projection lens 24 onto a screen outside the projector 1. Thereby, the projection of the image frame is completed. Afterwards, the flow of the flow chart returns back to the step S110 for another adjustment like the steps S110 to S140 to a next image frame.

Figure 6:
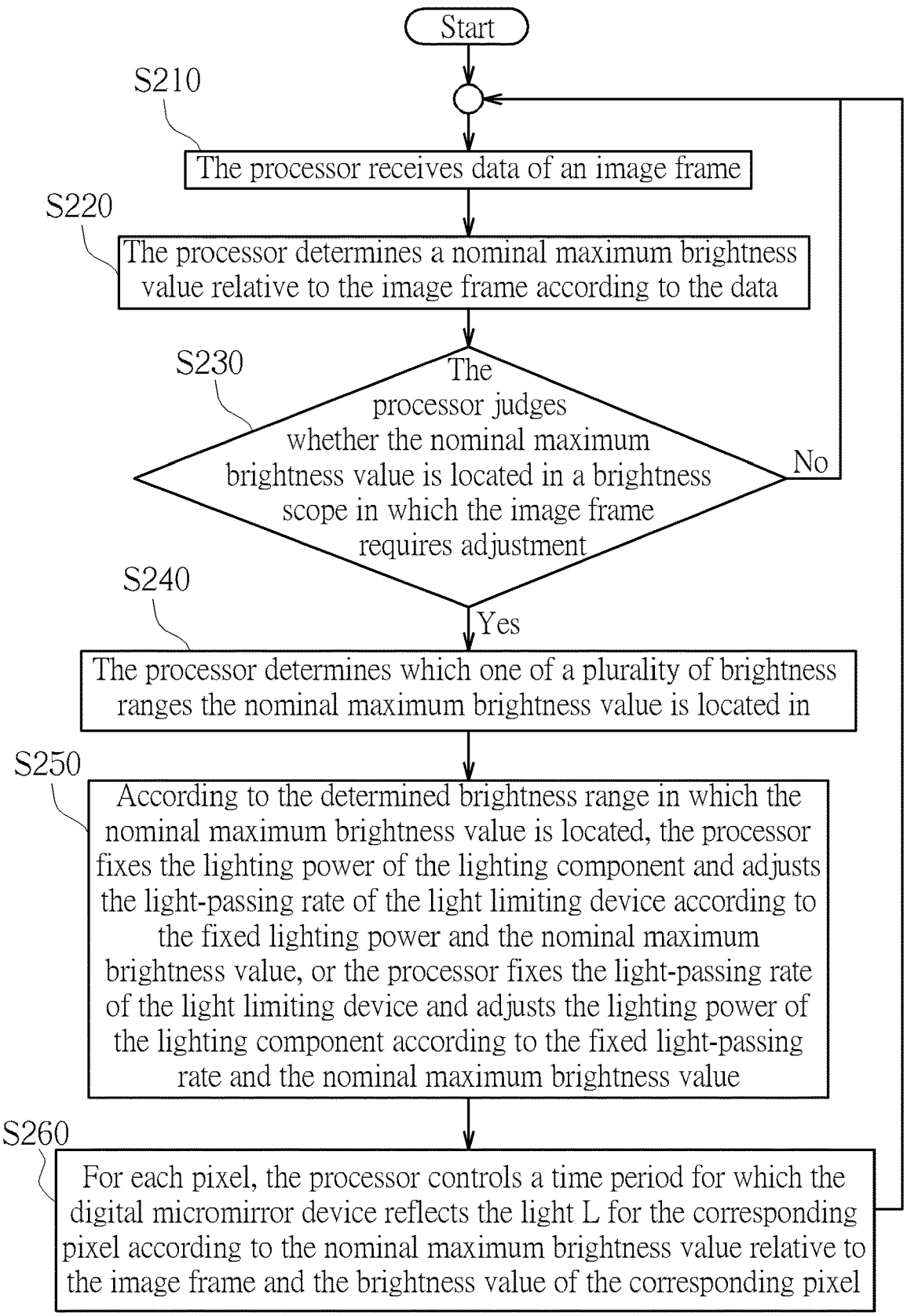
FIG. 6 is a flow chart of the dynamic brightness adjusting method in FIG. 5 according to an embodiment.

Please refer to FIG. 6, which is a flow chart of the dynamic brightness adjusting method in FIG. 5 according to an embodiment. As shown by FIG. 6, the processor 12 receives data of an image frame, as shown by the step S210. Then, the processor 12 determines a nominal maximum brightness value relative to the image frame according to the data, as shown by the step S220. Then, the processor 12 judges whether the nominal maximum brightness value is located in a brightness scope in which the image frame requires adjustment, as shown by the step S230. If the judgment of the step S230 is NO, the flow of the flow chart returns back to the step S210; that is, the dynamic brightness adjusting method receives data of a next image frame. If the judgment of the step S230 is YES, the processor 12 determines which one of a plurality of brightness ranges the nominal maximum brightness value is located in, as shown by the step S240. Therein, the plurality of the brightness ranges are of the brightness scope in which the image frame requires adjustment. For description simplification, the above first to fourth ranges are taken as the example for the plurality of the brightness ranges are; that is, the plurality of the brightness ranges include the first to fourth ranges. Afterwards, according to the determined brightness range in which the nominal maximum brightness value is located, the processor 12 fixes the lighting power of the lighting component 14 and adjusts the light-passing rate of the light limiting device 16 according to the fixed lighting power and the nominal maximum brightness value, or the processor 12 fixes the light-passing rate of the light limiting device 16 and adjusts the lighting power of the lighting component 14 according to the fixed light-passing rate and the nominal maximum brightness value, as shown by the step S250.

Furthermore, for the step S250, when the processor 12 determines that the nominal maximum brightness value is located in the first range (i.e. the brightness range from 40% to 80% brightness value), the processor 12 fixes the lighting power of the lighting component 14 (i.e. to be 80%) and adjusts the light-passing rate of the light limiting device 16 according to the fixed lighting power and the nominal maximum brightness value. When the processor 12 determines that the nominal maximum brightness value is located in the second range (i.e. the brightness range from 80% to 100% brightness value), the processor 12 fixes the light-passing rate of the light limiting device 16 (i.e. to be 100%) and adjusts the lighting power of the lighting component 14 according to the fixed light-passing rate and the nominal maximum brightness value. When the processor 12 determines that the nominal maximum brightness value is located in the third range (i.e. the brightness range from 0% to 30% brightness value), the processor 12 fixes the lighting power of the lighting component 14 (i.e. to 30%) and adjusts the light-passing rate of the light limiting device 16 according to the fixed lighting power and the nominal maximum brightness value. When the processor 12 determines that the nominal maximum brightness value is located in the fourth range (i.e. the brightness range from 30% to 40% brightness value), the processor 12 fixes the light-passing rate of the light limiting device 16 (i.e. to be 100%) and adjusts the lighting power of the lighting component 14 according to the fixed light-passing rate and the nominal maximum brightness value. For other descriptions about the first to fourth ranges (including the range setting and variations thereof), please refer to the relevant descriptions in the foregoing, which will not be repeated in addition. It is added that in the embodiment, the plurality of the brightness ranges substantially cover the whole brightness range of the image frame, so the processor 12 will implement the adjustment to every image frame in principle; however, the invention is not limited thereto. For example, in a practical application, the processor 12 implements the adjustment for increasing contrast only for image frames of which the nominal maximum brightness value is in two of the above ranges, which can reduce the load on the processor 12 and also can avoid influencing the smoothness of the projection of the projector 1. In addition, the adjustment to the lighting power of the lighting component 14 and the light-passing rate of the light limiting device 16 can be implemented through a look-up table, of which the establishment and utilization can be understood through the relevant descriptions in the foregoing and will not repeated in addition.

After the step S250, for each pixel, the processor 12 controls a time period for which the digital micromirror device 22 reflects the light L for the corresponding pixel according to the nominal maximum brightness value relative to the image frame and the brightness value of the corresponding pixel, as shown the step S260. Therein, as discussed above, the intensity loss of the light L due to the adjustment to the lighting power of the lighting component 14 and the light-passing rate of the light limiting device 16 can be compensated by controlling the time period for which the digital micromirror device 22 reflects the light L. Thereby, after reflected by the digital micromirror device 22, the light L is projected through the projection lens 24 onto a screen outside the projector 1. Thereby, the projection of the image frame is completed. Afterwards, the flow of the flow chart returns back to the step S210 for another adjustment like the steps S210 to S260 to a next image frame.

Figure 7:
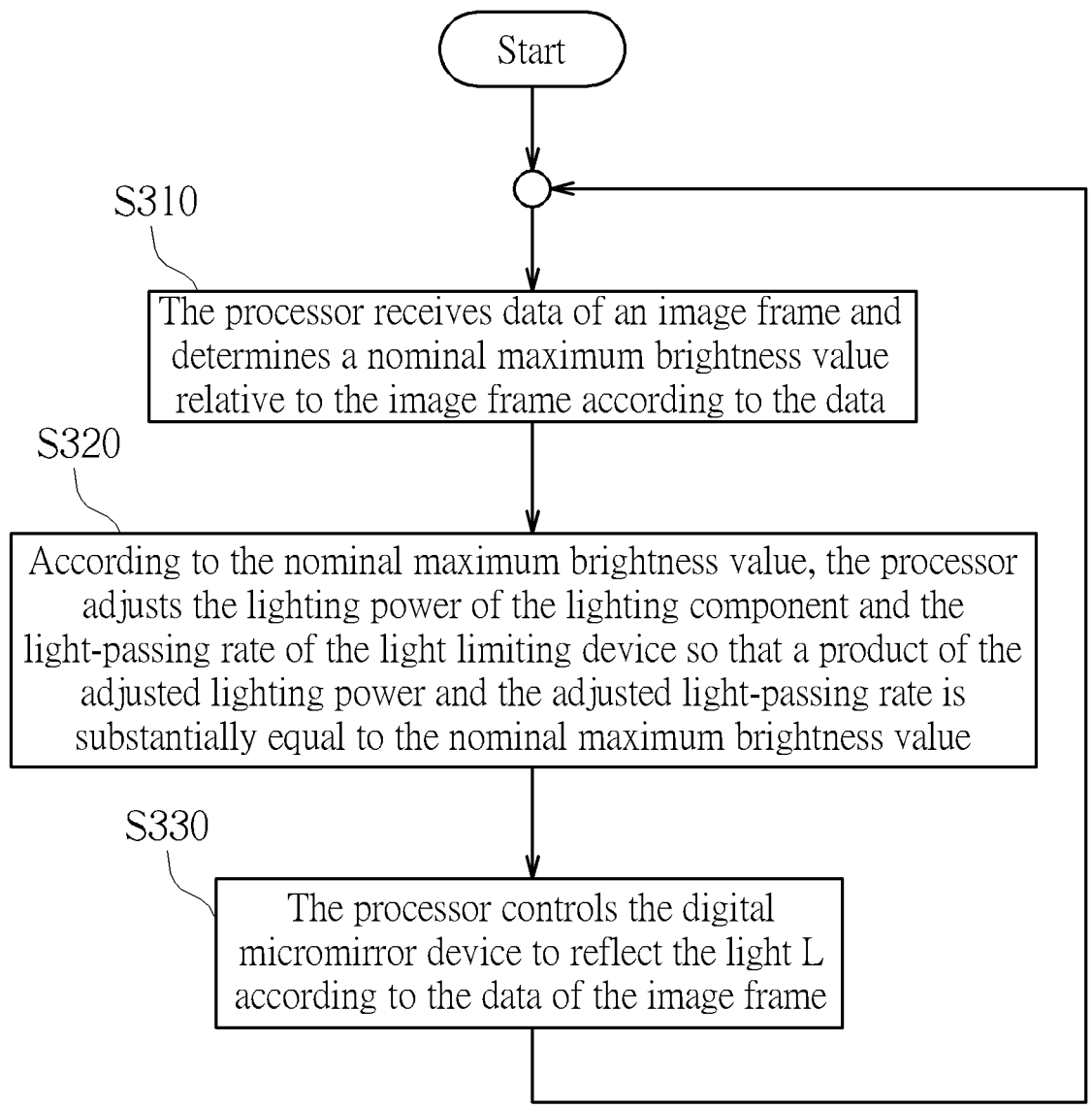
FIG. 7 is a flow chart of another dynamic brightness adjusting method according to the invention.

Please refer to FIG. 7, which is a flow chart of another dynamic brightness adjusting method according to the invention. The dynamic brightness adjusting method is used for adjusting output brightness of an image projected by a projector. For description simplification, the projector is achieved by the above projector 1, and therefore, for descriptions about the projector 1, please refer to the relevant descriptions and figures of the projector 1 in the foregoing, which will not be repeated in addition. As shown by FIG. 7, the dynamic brightness adjusting method includes: the processor 12 receiving data of an image frame and determining a nominal maximum brightness value relative to the image frame according to the data, as shown by the step S310; then, according to the nominal maximum brightness value, the processor 12 adjusting the lighting power of the lighting component 14 and the light-passing rate of the light limiting device 16 so that a product of the adjusted lighting power and the adjusted light-passing rate is substantially equal to the nominal maximum brightness value, as shown by the step S320; and then, the processor 12 controlling the digital micromirror device 22 to reflect the light L according to the data of the image frame, as shown by the step S330. After the projection of the image frame is completed, the flow of the flow chart of the dynamic brightness adjusting method returns back to the step S310 for another adjustment like the steps S310 to S330 to a next image frame.

In practice, the adjustment range of the lighting power of the lighting component 14 can be limited so as not to induce larger color distortion. For example, in the step S320, when the processor 12 determines that the nominal maximum brightness value is located in a predetermined brightness range, the processor 12 adjusts the lighting power of the lighting component 14 in an interval larger than 80% and less than 100%. In this case, the predetermined brightness range is set to be but not limited to a brightness range larger than 80% and less than 100%. For another example, in the step S320, when the processor 12 determines that the nominal maximum brightness value is located in another predetermined brightness range, the processor 12 adjusts the lighting power of the lighting component 14 in an interval larger than 30% and less than 40%. In this case, the predetermined brightness range is set to be but not limited to a brightness range larger than 30% and less than 40%. For another example, when the nominal maximum brightness value relative to the image frame is 90%, the processor 12 can simultaneously adjust the lighting power of the lighting component 14 to be 93% and the light-passing rate of the light limiting device 16 to be 97%. Furthermore, in practice, the dynamic brightness adjusting method shown by FIG. 7 can implement the step S320 (i.e. to simultaneously adjust the lighting power of the lighting component 14 and the light-passing rate of the light limiting device 16) only when the nominal maximum brightness value is located in some brightness ranges. For example, the step S320 is implemented only when the nominal maximum brightness value is located in the second range (i.e. the brightness range from 80% to 100% brightness value) and the fourth range (i.e. the brightness range from 30% to 40% brightness value).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dynamic brightness adjusting method for adjusting output brightness of an image projected by a projector, the projector comprising a processor, a lighting component, and a light limiting device, the light limiting device being disposed in front of the lighting component, the processor being electrically connected to the lighting component and the light limiting device, the processor being used to control the lighting component to emit light in a lighting power and control the light limiting device to allow the light to pass through in a light-passing rate, the dynamic brightness adjusting method comprising the following steps:
   (a) using the processor to receive data of an image frame and determining a nominal maximum brightness value relative to the image frame;
   (b) using the processor to determine which one of a plurality of brightness ranges the nominal maximum brightness value is located in; and
   (c) according to the determined brightness range in which the nominal maximum brightness value is located, using the processor to fix the lighting power of the lighting component and adjust the light-passing rate of the light limiting device according to the fixed lighting power and the nominal maximum brightness value, or using the processor to fix the light-passing rate of the light limiting device and adjust the lighting power of the lighting component according to the fixed light-passing rate and the nominal maximum brightness value, wherein the plurality of brightness ranges comprises three ranges, when the processor is used to determine that the nominal maximum brightness value is located in the middle one of the three ranges, the processor is used to fix the lighting power of the lighting component and adjust the light-passing rate of the light limiting device according to the fixed lighting power and the nominal maximum brightness value, and when the processor is used to determine that the nominal maximum brightness value is not located in the middle one of the three ranges, the processor is used to fix the light-passing rate of the light limiting device and adjust the lighting power of the lighting component according to the fixed lighting power and the nominal maximum brightness value.

2. The dynamic brightness adjusting method of claim 1, wherein the step (c) comprises:
   when the processor is used to determine that the nominal maximum brightness value is located in another one of the three ranges, using the processor to fix the light-passing rate of the light limiting device and adjust the lighting power of the lighting component according to the fixed light-passing rate and the nominal maximum brightness value.

3. The dynamic brightness adjusting method of claim 2, wherein the middle one of the three ranges is greater than a first brightness value lower limit and is less than a first brightness value upper limit, the first brightness value lower limit is 40%, the first brightness value upper limit is 80%, and when the processor is used to determine that the nominal maximum brightness value is located in the middle one of the three ranges, the processor is used to fix the lighting power of the lighting component to be 80%.

4. The dynamic brightness adjusting method of claim 3, wherein the plurality of brightness ranges comprises an additional range in addition to the three ranges, the additional range is greater than a third brightness value lower limit and is less than a third brightness value upper limit, the third brightness value lower limit is 0%, the third brightness value upper limit is 30%, and the step (c) comprises:
   when the processor is used to determine that the nominal maximum brightness value is located in the additional range, using the processor to fix the lighting power of the lighting component to be 30% and adjust the light-passing rate of the light limiting device according to the fixed lighting power and the nominal maximum brightness value.

5. The dynamic brightness adjusting method of claim 2, wherein the another one of the three ranges is greater than a second brightness value lower limit and is less than a second brightness value upper limit, the second brightness value lower limit is 80%, the second brightness value upper limit is 100%, and when the processor is used to determine that the nominal maximum brightness value is located in the another one of the three ranges, the processor is used to fix the light-passing rate of the light limiting device to be 100%.

6. The dynamic brightness adjusting method of claim 5, wherein the other one of the three ranges is greater than a fourth brightness value lower limit and is less than a fourth brightness value upper limit, the fourth brightness value lower limit is 30%, the fourth brightness value upper limit is 40%, and the step (c) comprises:
   when the processor is used to determine that the nominal maximum brightness value is located in the other one of the three ranges, using the processor to fix the light-passing rate of the light limiting device to be 100% and adjust the lighting power of the lighting component according to the fixed light-passing rate and the nominal maximum brightness value.

7. The dynamic brightness adjusting method of claim 2, wherein the another one of the three ranges is greater than a second brightness value lower limit and is less than a second brightness value upper limit, the second brightness value lower limit is 30%, the second brightness value upper limit is 40%, and when the processor is used to determine that the nominal maximum brightness value is located in the another one of the three ranges, the processor is used to fix the light-passing rate of the light limiting device to be 100%.

8. The dynamic brightness adjusting method of claim 2, wherein the lighting component has an original brightness curve between brightness output and luminous intensity input and an adjusted brightness curve between brightness output and luminous intensity input, variations of the lighting power of the lighting component are taken as the luminous intensity input of the adjusted brightness curve, a difference between the brightness output of the original brightness curve and the brightness output of the adjusted brightness curve corresponding to any of the luminous intensity input in the middle one of the three ranges is larger than a predetermined value, and a difference between the brightness output of the original brightness curve and the brightness output of the adjusted brightness curve corresponding to any of the luminous intensity input in the another one of the three ranges is less than the predetermined value.

9. The dynamic brightness adjusting method of claim 8, wherein the original brightness curve and the adjusted brightness curve are based on red light, white light, or a mixture of light by mixing red light, green light, and blue light in a ratio.

10. The dynamic brightness adjusting method of claim 1, the projector comprising a digital micromirror device, the processor being electrically connected to the digital micromirror device, the image frame comprising a plurality of pixels, the dynamic brightness adjusting method further comprising the following step:
for each pixel, according to the nominal maximum brightness value and a brightness value of the pixel, using the processor to control a time period for which the digital micromirror device reflects light for the pixel.

11. A dynamic brightness adjusting method for adjust output brightness of an image projected by a projector, the projector comprising a processor, a lighting component, and a light limiting device, the light limiting device being disposed in front of the lighting component, the processor being electrically connected to the lighting component and the light limiting device, the processor being used to control the lighting component to emit light in a lighting power and control the light limiting device to allow the light to pass through in a light-passing rate, the dynamic brightness adjusting method comprising the following steps:
(a) using the processor to receive data of an image frame and determine a nominal maximum brightness value relative to the image frame; and
(b) according to the nominal maximum brightness value, using the processor to adjust the lighting power of the lighting component and the light-passing rate of the light limiting device so that a product of the adjusted lighting power and the adjusted light-passing rate is substantially equal to the nominal maximum brightness value,
wherein the lighting component has an original brightness curve between brightness output and luminous intensity input and an adjusted brightness curve between brightness output and luminous intensity input, variations of the lighting power of the lighting component are taken as the luminous intensity input of the adjusted brightness curve, a difference between the brightness output of the original brightness curve and the brightness output of the adjusted brightness curve corresponding to any of the luminous intensity input in a first predetermined brightness range is larger than a predetermined value, a difference between the brightness output of the original brightness curve and the brightness output of the adjusted brightness curve corresponding to any of the luminous intensity input in a second predetermined brightness range is less than the predetermined value,
when the processor is used to determine that the nominal maximum brightness value is located in the first predetermined brightness range, the processor is used to fix the lighting power of the lighting component, and
when the processor is used to determine that the nominal maximum brightness value is located in the second predetermined brightness range, the processor is used to adjust the lighting power of the lighting component.

12. The dynamic brightness adjusting method of claim 11, wherein in the step (b), when the processor is used to determine that the nominal maximum brightness value is located in the second predetermined brightness range, the processor is used to adjust the lighting power of the lighting component in an interval larger than 80% and less than 100%.

13. The dynamic brightness adjusting method of claim 11, wherein in the step (b), when the processor is used to determine that the nominal maximum brightness value is located in the second predetermined brightness range, the processor is used to adjust the lighting power of the lighting component in an interval larger than 30% and less than 40%.

14. A projector, comprising:
a digital micromirror device;
a lighting component, disposed toward the digital micromirror device;
a light limiting device, disposed between the lighting component and the digital micromirror device;
a projection lens; and
a processor, electrically connected to the lighting component, the light limiting device, and the digital micromirror device respectively, the processor being configured to control the lighting component to emit light in a lighting power, control the light limiting device to allow the light to pass through in a light-passing rate, and control the digital micromirror device to reflect the light passing through the light limiting device to be projected out the projector through the projection lens;
wherein when the processor is configured to receive data of an image frame, the processor is configured to determine a nominal maximum brightness value relative to the image frame according to the data, the processor is configured to determines which one of a plurality of brightness ranges the nominal maximum brightness value is located in, and according to the determined brightness range in which the nominal maximum brightness value is located, the processor is configured to fix the lighting power of the lighting component and adjusts the light-passing rate of the light limiting device according to the fixed lighting power and the nominal maximum brightness value, or the processor is configured to fix the light-passing rate of the light limiting device and adjust the lighting power of the lighting component according to the fixed light-passing rate and the nominal maximum brightness value; and
wherein the plurality of brightness ranges comprises three ranges, when the processor is configured to determine that the nominal maximum brightness value is located in the middle one of the three ranges, the processor is configured to fix the lighting power of the lighting component and adjusts the light-passing rate of the light limiting device according to the fixed lighting power and the nominal maximum brightness value, and when the processor is configured to determine that the nominal maximum brightness value is not located in the middle one of the three ranges, the processor is configured to fix the light-passing rate of the light limiting device and adjust the lighting power of the lighting component according to the fixed lighting power and the nominal maximum brightness value.

15. The projector of claim 14, wherein when the processor is configured to determine that the nominal maximum brightness value is located in another one of the three ranges, the processor is configured to fix the light-passing rate of the light limiting device and adjust the lighting power of the lighting component according to the fixed light-passing rate and the nominal maximum brightness value.

16. The projector of claim 15, wherein the middle one of the three ranges is greater than a first brightness value lower limit and is less than a first brightness value upper limit, the first brightness value lower limit is 40%, the first brightness value upper limit is 80%, and when the processor is configured to determine that the nominal maximum brightness value is located in the first range, the processor is configured to fix the lighting power of the lighting component to be 80%.

17. The projector of claim 16, wherein the plurality of brightness ranges comprises an additional range in addition to the three ranges, the additional range is greater than a third brightness value lower limit and is less than a third brightness value upper limit, the third brightness value lower limit is 0%, the third brightness value upper limit is 30%, and when the processor is configured to determine that the nominal maximum brightness value is located in the additional range, the processor is configured to fix the lighting power of the lighting component to be 30% and adjusts the light-passing rate of the light limiting device according to the fixed lighting power and the nominal maximum brightness value.

18. The projector of claim 15, wherein the another one of the three ranges is greater than a second brightness value lower limit and is less than a second brightness value upper limit, the second brightness value lower limit is 80%, the second brightness value upper limit is 100%, and when the processor is configured to determine that the nominal maximum brightness value is located in the another one of the three ranges, the processor is configured to fix the light-passing rate of the light limiting device to be 100%.

19. The projector of claim 18, wherein the other one of the three ranges is greater than a fourth brightness value lower limit and is less than a fourth brightness value upper limit, the fourth brightness value lower limit is 30%, the fourth brightness value upper limit is 40%, and when the processor is configured to determine that the nominal maximum brightness value is located in the other one of the three ranges, the processor is configured to fix the light-passing rate of the light limiting device to be 100% and adjust the lighting power of the lighting component according to the fixed light-passing rate and the nominal maximum brightness value.

20. The projector of claim 15, wherein the another one of the three ranges is greater than a second brightness value lower limit and is less than a second brightness value upper limit, the second brightness value lower limit is 30%, the second brightness value upper limit is 40%, and when the processor is configured to determine that the nominal maximum brightness value is located in the another one of the three ranges, the processor is configured to fix the light-passing rate of the light limiting device to be 100%.

21. The projector of claim 14, wherein the image frame comprises a plurality of pixels, and for each pixel, according to the nominal maximum brightness value and a brightness value of the pixel, the processor is configured to control a time period for which the digital micromirror device reflects light for the pixel.

22. A dynamic brightness adjusting method for adjusting output brightness of an image projected by a projector, the projector comprising a processor, a lighting component, and a light limiting device, the light limiting device being disposed in front of the lighting component, the processor being electrically connected to the lighting component and the light limiting device, the processor being used to control the lighting component to emit light in a lighting power and control the light limiting device to allow the light to pass through in a light-passing rate, the dynamic brightness adjusting method comprising the following steps:
    (a) using the processor to receive data of an image frame and determining a nominal maximum brightness value relative to the image frame;
    (b) using the processor to determine which one of a plurality of brightness ranges the nominal maximum brightness value is located in; and
    (c) according to the determined brightness range in which the nominal maximum brightness value is located, using the processor to fix the lighting power of the lighting component and adjust the light-passing rate of the light limiting device according to the fixed lighting power and the nominal maximum brightness value, or using the processor to fix the light-passing rate of the light limiting device and adjust the lighting power of the lighting component according to the fixed light-passing rate and the nominal maximum brightness value,
    wherein the plurality of brightness ranges comprises a first range and a second range, the first range is different from the second range, the lighting component has an original brightness curve between brightness output and luminous intensity input and an adjusted brightness curve between brightness output and luminous intensity input, variations of the lighting power of the lighting component are taken as the luminous intensity input of the adjusted brightness curve, a difference between the brightness output of the original brightness curve and the brightness output of the adjusted brightness curve corresponding to any of the luminous intensity input in the first range is larger than a predetermined value, a difference between the brightness output of the original brightness curve and the brightness output of the adjusted brightness curve corresponding to any of the luminous intensity input in the second range is less than the predetermined value,
    when the processor is used to determine that the nominal maximum brightness value is located in the first range, using the processor to fix the lighting power of the lighting component and adjust the light-passing rate of the light limiting device according to the fixed lighting power and the nominal maximum brightness value, and
    when the processor is used to determine that the nominal maximum brightness value is located in the second range, using the processor to fix the light-passing rate of the light limiting device and adjust the lighting power of the lighting component according to the fixed light-passing rate and the nominal maximum brightness value.

23. A dynamic brightness adjusting method for adjusting output brightness of an image projected by a projector, the projector comprising a processor, a lighting component, and a light limiting device, the light limiting device being disposed in front of the lighting component, the processor being electrically connected to the lighting component and the light limiting device, the processor is used to control the lighting component to emit light in a lighting power and control the light limiting device to allow the light to pass through in a light-passing rate, the dynamic brightness adjusting method comprising the following steps:

(a) using the processor to receive data of an image frame and determining a nominal maximum brightness value relative to the image frame;

(b) using the processor to determine which one of a plurality of brightness ranges the nominal maximum brightness value is located in; and (c) according to the determined brightness range in which the nominal maximum brightness value is located, using the processor to fix the lighting power of the lighting component and adjust the light-passing rate of the light limiting device according to the fixed lighting power and the nominal maximum brightness value, or using the processor to fix the light-passing rate of the light limiting device and adjust the lighting power of the lighting component according to the fixed light-passing rate and the nominal maximum brightness value;

wherein the plurality of brightness ranges comprises a first range, a second range, and a third range which are different from each other, the first range is greater than a first brightness value lower limit and is less than a first brightness value upper limit, the first brightness value lower limit is 40%, the first brightness value upper limit is 80%, the third range is greater than a third brightness value lower limit and is less than a third brightness value upper limit, the third brightness value lower limit is 0%, the third brightness value upper limit is 30%, when the processor is used to determine that the nominal maximum brightness value is located in the first range, using the processor to fix the lighting power of the lighting component to be 80% and adjust the light-passing rate of the light limiting device according to the fixed lighting power and the nominal maximum brightness value, when the processor is used to determine that the nominal maximum brightness value is located in the second range, using the processor to fix the light-passing rate of the light limiting device and adjust the lighting power of the lighting component according to the fixed light-passing rate and the nominal maximum brightness value, and when the processor is used to determine that the nominal maximum brightness value is located in the third range, using the processor to fix the lighting power of the lighting component to be 30% and adjust the light-passing rate of the light limiting device according to the fixed lighting power and the nominal maximum brightness value.

24. A dynamic brightness adjusting method for adjusting output brightness of an image projected by a projector, the projector comprising a processor, a lighting component, and a light limiting device, the light limiting device being disposed in front of the lighting component, the processor being electrically connected to the lighting component and the light limiting device, the processor is used to control the lighting component to emit light in a lighting power and control the light limiting device to allow the light to pass through in a light-passing rate, the dynamic brightness adjusting method comprising the following steps:

(a) using the processor to receive data of an image frame and determining a nominal maximum brightness value relative to the image frame;

(b) using the processor to determine which one of a plurality of brightness ranges the nominal maximum brightness value is located in; and (c) according to the determined brightness range in which the nominal maximum brightness value is located, using the processor to fix the lighting power of the lighting component and adjust the light-passing rate of the light limiting device according to the fixed lighting power and the nominal maximum brightness value, or using the processor to fix the light-passing rate of the light limiting device and adjust the lighting power of the lighting component according to the fixed light-passing rate and the nominal maximum brightness value, wherein the plurality of brightness ranges comprises a first range, a second range, and a fourth range which are different from each other, the first range is different from the second range, the second range is greater than a second brightness value lower limit and is less than a second brightness value upper limit, the second brightness value lower limit is 80%, the second brightness value upper limit is 100%, the fourth range is greater than a fourth brightness value lower limit and is less than a fourth brightness value upper limit, the fourth brightness value lower limit is 30%, the fourth brightness value upper limit is 40%, when the processor is used to determine that the nominal maximum brightness value is located in the first range, using the processor to fix the lighting power of the lighting component and adjust the light-passing rate of the light limiting device according to the fixed lighting power and the nominal maximum brightness value, when the processor is used to determine that the nominal maximum brightness value is located in the second range, using the processor to fix the light-passing rate of the light limiting device to be 100% and adjust the lighting power of the lighting component according to the fixed light-passing rate and the nominal maximum brightness value, and when the processor is used to determine that the nominal maximum brightness value is located in the fourth range, using the processor to fix the light-passing rate of the light limiting device to be 100% and adjust the lighting power of the lighting component according to the fixed light-passing rate and the nominal maximum brightness value.

* * * * *